Goodwin & Hawkins,
Wind Wheel,
Nº 14,626.                    Patented Apr. 8 1856.
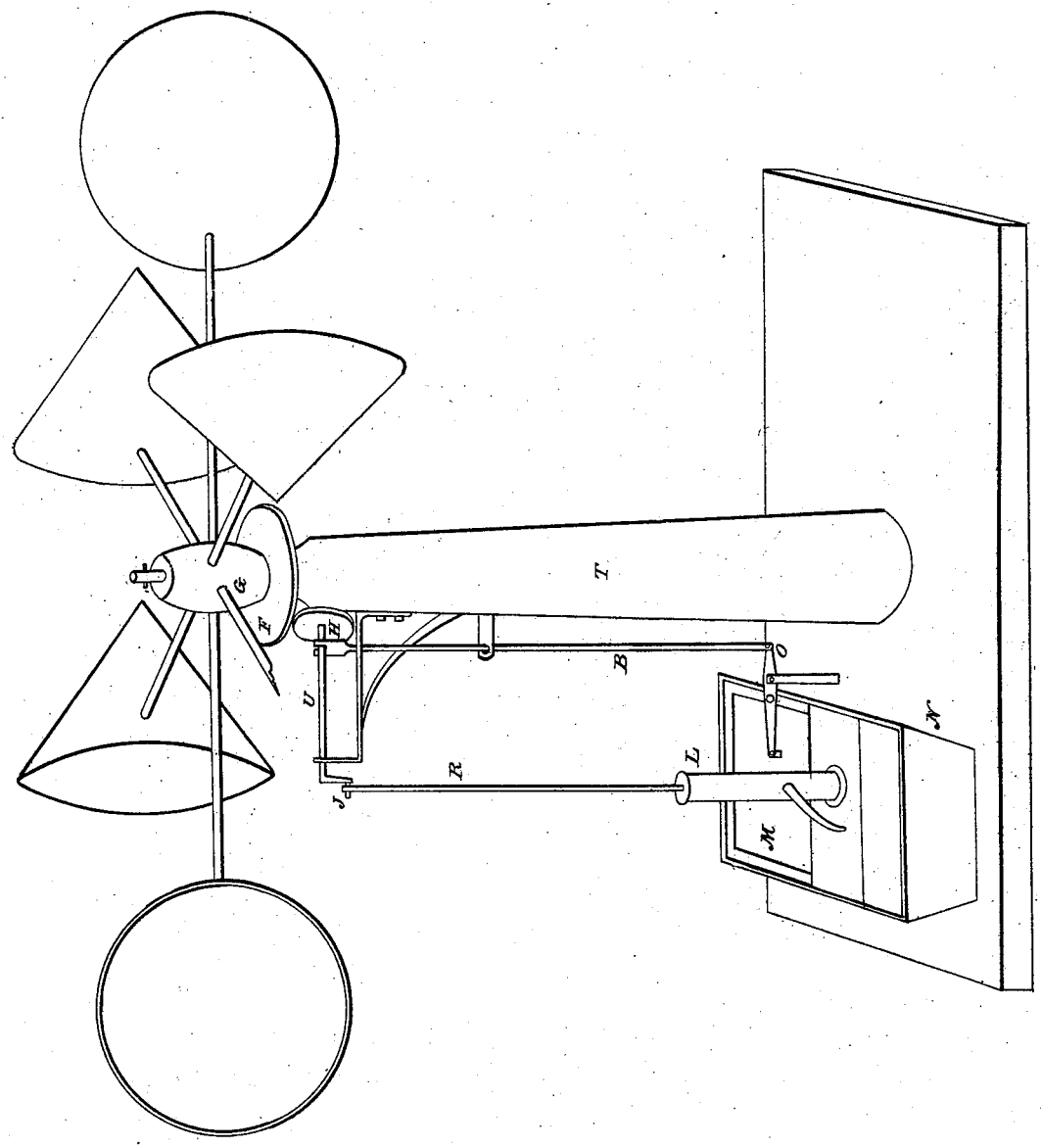

UNITED STATES PATENT OFFICE.

JACOB WALDEN GOODWIN AND MOSES CHAMPEN HAWKINS, OF EDEN-BOROUGH, PENNSYLVANIA.

IMPROVED METHOD OF REGULATING PUMPS BY WIND-WHEELS.

Specification forming part of Letters Patent No. 14,626, dated April 8, 1856.

*To all whom it may concern:*

Be it known that we, JACOB WALDEN GOODWIN and MOSES CHAMPEN HAWKINS, of Edenborough, in the county of Erie and State of Pennsylvania, have invented a new and useful Wind-Pump; and we do hereby declare that the following is a full and exact description thereof, reference being had to the accompanying drawings and the letters of reference marked thereon.

Figure 1 represents our machine with all its parts adjusted in working order, with the exception that one of the wind funnels or sails at *u* has been left off for the purpose of better showing the machinery.

A, B, C, D, and E are large funnel-shaped wings or sails, made out of sheet-iron or other suitable materials. These wings or sails are attached to arms or spokes which enter the hub G. This hub turns around freely on the pin S, and resting on a shoulder on the main post T. On the lower end of the hub G is the driving-wheel F, which is bolted to the hub G, and consequently turns with it.

U is a shaft, with a wheel H on one end, which may either be made with cogs to gear into corresponding cogs on the driving-wheel F, or both may be constructed without cogs, and the edge of the wheel H, running on the under surface of the wheel F and so constructed as to run by friction alone, as shown in the model sent with this application. The other end of the shaft *u* ends in a crank I, which drives the piston-rod K which works the pump L.

N is a watering-trough, and M a float therein, so constructed of tin, sheet-iron, or wood that it will rise or sink with the surface of the water in the trough.

O is a lever, which is worked by the rising and falling of the float M. This lever works the elevating-rod P, which supports the wheel end of the shaft U, and as the float M sinks the wheel H is brought in contact with the wheel F, and consequently the pump L is put in motion, and as the trough N is filled with water the float M rises and the rod P is drawn down, the wheel H drops out of gear, and the pump ceases, although the wind-wheel continues to revolve.

Now as soon as the cattle drink out the water from the trough N the float M falls and the elevating-rod P rise; consequently the wheel H is again brought in contact with the driving-wheel F and the pump is again put in operation, thus keeping the watering-trough N always full, and yet not wasting the water.

By constructing the wind-wheel with the funnels or wind-sails constructed in the shape of a funnel it is evident that it will make no difference in which direction the wind blows, as one side of the wheel will always present the open end of the funnels to it.

What we claim as our invention, and desire to secure by Letters Patent of the United States, is—

1. The construction of a wind-wheel with the sails shaped like a funnel and always presenting the open ends of those on one side of the wheel to the blast.

2. The construction of the float M and the lever O, with the elevating-rod P, in combination with the wheel H, so constructed in the manner described as to be raised and lowered by the rising and falling of the float M, in the manner described, or by any other construction substantially the same and which will produce the same results.

JACOB WALDEN GOODWIN.
MOSES CHAMPEN HAWKINS.

Witnesses:
A. B. RICHMOND,
H. B. BROOKS.